United States Patent Office 2,982,995
Patented May 9, 1961

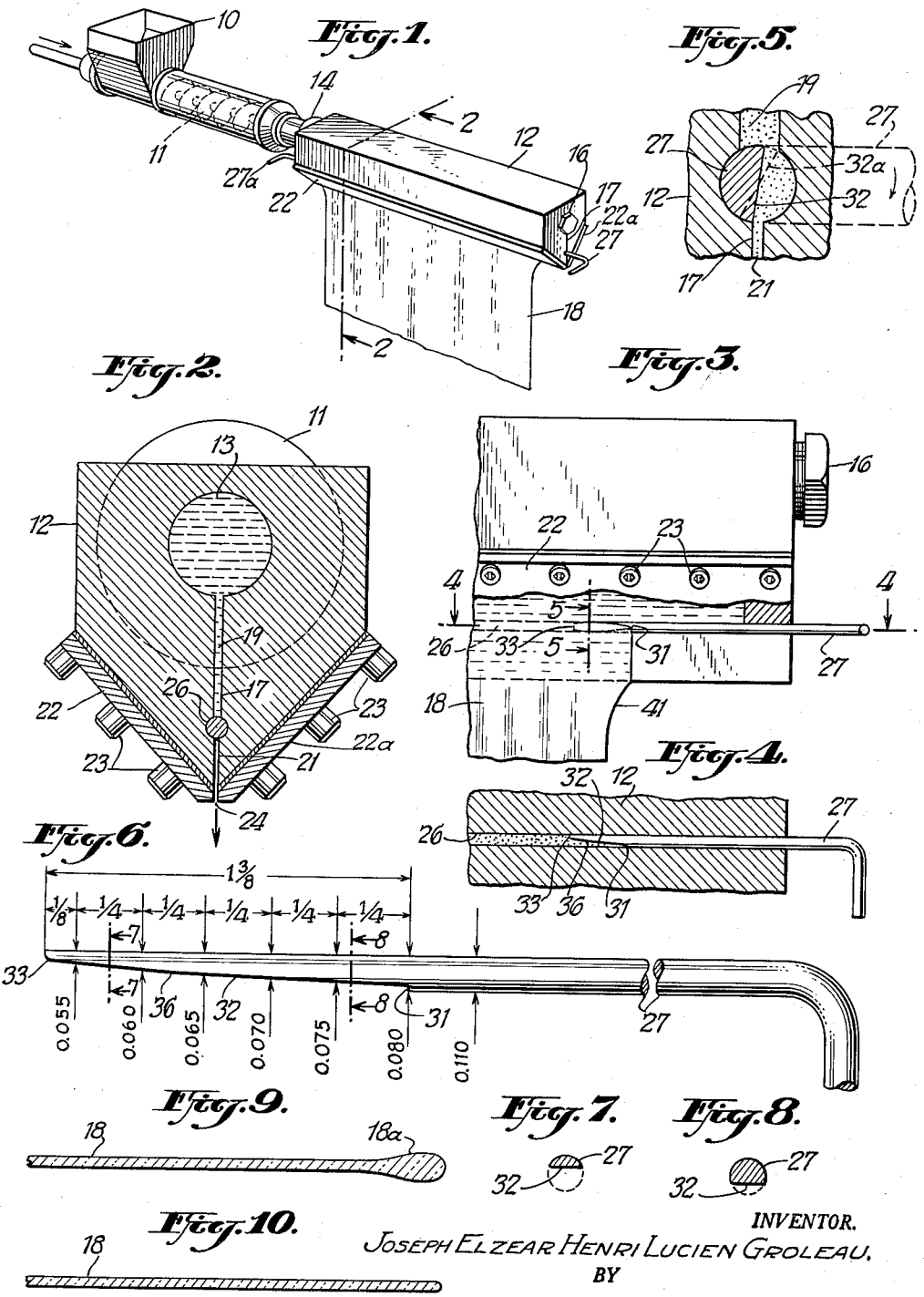

2,982,995
CONTROL OF THE EDGE FORMATION OF EXTRUDED PLASTIC FILM

Joseph Elzear Henri Lucien Groleau, Cap de la Madeleine, Quebec, Canada, assignor to St. Regis Paper Company, New York, N.Y., a corporation of New York Filed Sept. 28, 1959, Ser. No. 842,963
Claims priority, application Canada Oct. 9, 1958
9 Claims. (Cl. 18—12)

This invention relates to sheet or film-forming apparatus which is employed in the extrusion of organic materials, such for example as polyethylene, cellulose derivatives, resins, synthetic rubber, rubber derivatives and linear condensation polymers.

One of the most serious problems encountered in the extrusion of thin films or sheets, whether or not they are cast onto a supporting sheet, is non-uniform thickness at the edges. In forming these films, the film-forming material is forced through a die slot with an opening corresponding generally to the desired width of the finished film, and the die slot is generally provided with a pair of adjustable blades for precise control of the film thickness. The edges of the finished extruded or die cast film are normally from about two to eight or more times the thickness of the central portion. This is commonly referred to as a "bead edge" and is caused by surface tension effects which are governed in part by the fluidity of the film-forming material and the tension applied to the film before it strikes its support. As a result of this "necking" or "drawing-in," it is necessary to cut away and discard these beaded edges, which of course greatly increases the unit cost of the film.

Attempts have been made to reduce the thickness and width of the bead by tapering the outer edges of the die opening and also by extruding the edges of the film onto wires and leading the same to the support or casting roller while stretching the film transversely. It has also been proposed to reduce the tendency to neck-in by positioning the extrusion blades very close to the casting roll or support. None of these methods have satisfactorily solved the bead problem, and while they are effective to reduce the width of the edge of increased thickness, it is still necessary, particularly with polyethylene, to shear off the outer edge of the film in order to obtain a product of acceptable uniform thickness. Where polyethylene, for example, is extruded onto a running length of kraft paper, removal of the beaded edge generally involves loss of the paper as well.

In each of the previously proposed methods for reducing the effect of necking-in, auxiliary apparatus is required, for example, the wires onto which the edges of the film are extruded, or means for controlling, e.g., bending, the extrusion blades at the edges of the die. In accordance with the present invention the tendency of the film to neck-in is reduced to the point where it is unnecessary to trim away the outer edges of the film simply by modifying existing extruding apparatus, without the use of additional equipment.

In apparatus designed to produce a variety of widths of sheet or film as distinguished from a device designed to extrude only one material of a given width, the width of the film is controlled by means of a deckle rod inserted into the extrusion slot at each edge above the lower or exit end of the slot, or above the blades which may be affixed to the exit end of the die. The width of the film is varied, for example reduced, simply by further inserting the deckle rod into the flowing material in the die, or increased by withdrawing the same. Deckle rods employed for this purpose have a circular cross-section and a square blunt end.

The present invention provides a modified deckle rod, hereinafter referred to as a "metering deckle rod," which not only controls the width of the film extruded, but also meters the quantity of film-forming material passing through the slot adjacent the effective outer edges thereof. By means of the metering feature of the present invention it is possible to reduce the amount of film-former flowing through the die at the die edges, and while there is still a tendency for the plastic material to draw-in at the edges this effect is offset by the reduced amount of plastic in these critical outer areas of the film. The result is a film product of uniform or much more nearly uniform thickness than has been possible heretofore.

The apparatus of the present invention thus comprises the novel metering deckle rod in combination with a die having a slot therein for extrusion of the film-forming material. The exit end of the slot may, if desired, be provided with suitable die blades of more wear resistant material than the body of the die and which may be adjustable, thereby enabling extrusion of sheets of various thicknesses with the same die. A hole is drilled into the die from each of its sides normally of the extrusion slot, or a single hole may be drilled from one side of the die to the other. A metering deckle valve rod is inserted into the hole on each end of the die and extends into the extrusion slot a distance determined by the width of film desired. The deckle rod has a substantially circular cross-section with diameter preferably corresponding to the maximum diameter of the hole. Intermediate its ends the rod is provided with a transversely inwardly directed step and a flat portion extending from the base of this step to the inner end of the rod, which flat portion constitutes the metering surface of the rod. By simply rotating the rod, it is possible to control the quantity of material passing through the slot at the outer edge, as will be seen hereinafter.

The invention will be more fully described with reference to the accompanying drawings in which Fig. 1 is a perspective view of an extrusion apparatus in accordance with the present invention;

Fig. 2 is a vertical section of the extrusion die on the line 2—2 of Fig. 1;

Fig. 3 is an enlarged fragmentary elevation, partly in section, of a portion of the extrusion die of Fig. 1;

Fig. 4 is a partial section taken on the line 4—4 of Fig. 3;

Fig. 5 is an enlarged section taken on the line 5—5 of Fig. 3;

Fig. 6 is a plan of a preferred form of metering deckle rod for the extrusion of polyethylene film;

Fig. 7 is a sectional elevation taken on the line 7—7 of Fig. 6;

Fig. 8 is a view similar to Fig. 7, but taken on the line 8—8 of Fig. 6;

Fig. 9 is an enlarged cross-section of an extruded film showing the beaded edge found on films extruded on conventional prior apparatus; and Fig. 10 is a view similar to Fig. 9 on the same scale illustrating the film edge results obtainable with the apparatus of the present invention.

Referring to Fig. 1, a preferred apparatus includes a hopper 10 for the material to be extruded and a screw conveyor 11 for conveying the film-forming material under pressure into a die 12. As seen in Fig. 2, the die is provided with a hollow central portion or header 13 which extends the length of the die. The header is open at one end and communicates with the screw, as at 14, and is closed at its opposed end as by a threaded plug 16. The die is channeled as at 17 to provide an extrusion slot communicating with the header 13 through which the film-forming material is forced and from the exit end of which a film 18 issues. The extrusion slot is preferably of uniform width from the header to its exit end 24, although it may be wider in the upper portion 19 than in the lower portion 21, or the sides of the slot may taper inwardly toward the exit end. The die is preferably provided with a pair of blades 22 and 22a which are adjustably secured to the die body by means of studs 23. Without the blades the die 12 would be suitable to extrude only a film of a given thickness.

In a preferred embodiment, the die 12 is drilled above its exit end 24 to provide a circular hole 26 in a slot 17 (see Fig. 2) into which metering deckle rods 27 and 27a are inserted. The hole 26 preferably extends the length of the die and thus by choice of deckle rod length, the width of film extruded may be varied from very narrow to almost as wide as the die slot.

The metering deckle rod employed in the present invention has a circular cross-section of uniform diameter over a major portion of its length, and is provided with a transversely inwardly directed step 31, as seen in Fig. 6, near its inner end 33, and a flat side 32 extending from the base of said step to the inner end. The flat surface 32 tapers from the base of step 31 toward the opposite side of the rod as seen in Figs. 4 and 6.

The step portion 31 acts as a stop for the film-forming material passing through the die slot in a manner similar to the square end of a conventional deckle rod. The flat portion of the rod beyond the step serves as a metering surface and by rotating the rod as indicated in Fig. 5 it is possible to control the amount of film-forming material entering the lower end 21 (Fig. 2) of the extrusion slot adjacent the edge of the film. As seen in Fig. 5, flat metering surface 32 is nearly in line with the vertical axis of the extrusion slot and the flow of material is restricted. Rotation of metering deckle rod 27 as indicated by the arrow causes metering surface 32 to assume the position indicated by the dotted line 32a, further restricting the flow of material. This simple method of controlling the flow of the film-former adjacent the edges is important because of the varying characteristics of different manufacturers' products. A different material or simply a difference in viscosity of the same film-forming material may thus be taken into account simply by rotating the rod. The tapered surface in effect acts as a throttle to reduce the amount of plastic issuing from the die at the film edges. While there is still a tendency for the film-forming material to neck-in as at 41 in Fig. 3, by reducing the amount of plastic flow-out in this critical area, bead effect is offset and a film of uniform thickness is produced.

The uniformity of the product obtained by the apparatus of the present invention as compared with that of the prior art is readily apparent from a comparison of Figs. 9 and 10. The normal bead 18a and section of increased thickness leading up to the bead is conspicuously absent from the product extruded with the present apparatus.

In the preferred metering deckle rod the flat or metering surface tapers first at one angle and then at an increased angle to the end of the rod. As seen in Fig. 6, the flat surface 32 is tapered at a given angle from the base of step 31 to a point 36 about two-thirds of the distance to the end 33 of the rod, and thence at an increased angle to the end. On the preferred rod the increased angle of taper adjacent the end is about twice the initial taper angle adjacent the step. The lesser taper adjacent the step serves to reduce pressure build-up at the film edge, which is occasionally encountered where the metering surface tapers at a uniform angle over its entire length. Pressure build-up at this point causes a thicker film edge.

The dimensions appearing on Fig. 6 are those of a preferred metering deckle rod for the extrusion of polyethylene film of a few thousandths of an inch thickness onto kraft paper. As can be seen, the diameter of the rod is 0.11 inch, the depth of step 31 is 0.03 inch and the taper of surface 32 up to point 36 is approximately 1°-9′, while the taper to end 33 is twice this angle. It has been observed that increased taper results in an increase in the thickness of the film edges, and if the taper angle is decreased, the film has a decreased thickness on the edge and an increased thickness inside the edge as compared with the normal thickness of the film at its mid-point.

A metering deckle rod with but a single taper in the flat surface between the step and the inner end of the rod is also within the scope of the present invention. Such a rod should taper at about 1 to 3 degrees. As indicated above, such construction may produce undesirable pressure build-up adjacent the step, and accordingly the two-taper surface is preferred.

The metering rod is preferably rounded at its end 33, as shown in Fig. 6, to prevent scratching of the inner surface of the hole into which it is inserted. Rounding also prevents the slight line on the film which is produced by a square end. Also the shoulder of the step 31 of the metering rod is preferably, although not necessarily, rounded. The rod of the present invention is also preferably chrome plated to assure a surface of maximum smoothness to which the material being extruded will not adhere.

What is claimed and desired to be secured by Letters Patent is:

1. Apparatus for extruding films or sheets of organic plastic material, which comprises an extrusion die having an extrusion slot therein for forming said films and sheets, said slot being formed above its exit end and at least at and adjacent its outer edges to provide a generally circular portion as said slot is viewed in cross-section, and a pair of metering deckle rods each slidably extending into said circular portion from opposite sides of the die to define the desired width of film extruded and control the flow of material adjacent the effective edges of said slot, each rod over a portion of its length having a substantially uniform circular cross-section and being provided at the inner terminus of said uniform cross-section with an undercut step and a substantially flat metering surface extending therefrom in the direction of the inner end of said rod, said metering surface tapering from said step toward the opposite side of the rod.

2. Apparatus for extruding films or sheets of organic plastic material, which comprises an extrusion die having a slot therein for forming said films and sheets, said slot being formed above its exit end and at least at and adjacent its outer edges to provide a generally circular portion, as said slot is viewed in cross-section, having a transverse dimension greater than the width of said slot, and a pair of rotatable metering deckle rods each slidably extending into said circular portion from opposite sides of the die to define the desired width of film extruded and to control the flow of material adjacent the effective edges of said slot, each rod over a portion of its length having a substantially uniform circular cross-section and being provided with a transversely inwardly directed step at the inner terminus of said uniform cross-section and an undercut substantially flat metering surface extending from the base of said step to the inner end of said rod, said surface tapering from said step toward the opposite side of the rod.

3. Apparatus for extruding films or sheets of organic plastic material, which comprises an extrusion die having an extrusion slot therein for forming said films and sheets, said slot being formed above its exit end and at least at and adjacent its outer edges to provide a generally circular portion as said slot is viewed in cross-section, and a pair of rotatable metering deckle rods each slidably extending into said circular portion from opposite sides of the die to define the desired width of film extruded and to control the flow of material adjacent the effective edges of said slot, each rod over a portion of its length having a substanitally uniform circular cross-section and being provided at the inner terminus of said uniform cross-section with an undercut step and substantially flat metering surface extending therefrom to the inner end of said rod, said metering surface tapering from said step toward the opposite side of the rod, the width of said tapered metering surface increasing from said step to a maximum intermediate the step and inner end of the rod and thence decreasing to said end.

4. Apparatus as set forth in claim 3 wherein the maximum width of said tapered metering surface is the diameter of the deckle rod.

5. Apparatus for extruding films or sheets of organic plastic material, which comprises an extrusion die with an extrusion slot therein for forming films and sheets, said slot being formed above its exit end and at least at and adjacent its outer edges to provide a generally circular portion as said slot is viewed in cross-section, and a pair of rotatable metering deckle rods each slidably extending into said circular portion from opposite sides of the die to define the desired width of film extruded and to control the flow of material adjacent the effective edges of said slot, each rod over a portion of its length having a substantially uniform circular cross-section and being provided at the inner terminus of said uniform cross-section with a transversely inwardly directed step and a substantially flat metering surface extending from the base of said step to the inner end of said rod, said metering surface tapering at an angle from said step toward the opposite side of the rod to a point intermediate said step and rod end and thence tapering at a greater angle to said end.

6. Apparatus as set forth in claim 5 wherein the depth of said step is between about 25 and 30% of the diameter of said metering deckle rod.

7. Apparatus as set forth in claim 5 wherein the angle of taper of said metering surface adjacent the rod end is substantially twice the angle of taper adjacent the step.

8. Apparatus as set forth in claim 5 wherein the point at which the taper of the metering surface changes is about two-thirds of the distance from the step to the rod end.

9. Apparatus as set forth in claim 5 wherein the metering surface has a maximum width intermediate the point of taper change and the rod end.

References Cited in the file of this patent

UNITED STATES PATENTS

| | | |
|---|---|---|
| 2,300,211 | Eberlin | Oct. 27, 1942 |
| 2,859,475 | Tornberg | Nov. 11, 1958 |
| 2,865,048 | Hudson | Dec. 23, 1958 |